United States Patent
Zhang et al.

(10) Patent No.: US 12,474,364 B2
(45) Date of Patent: Nov. 18, 2025

(54) SPEED MEASUREMENT METHOD AND APPARATUS BASED ON MULTIPLE CAMERAS

(71) Applicant: ANHUI EYEVOLUTION TECHNOLOGY CO., LTD., Anhui (CN)

(72) Inventors: Xiaolin Zhang, Anhui (CN); Lei Wang, Anhui (CN); Dongdong Yang, Anhui (CN); Hong Liang, Anhui (CN); Jiamao Li, Anhui (CN)

(73) Assignee: ANHUI EYEVOLUTION TECHNOLOGY CO., LTD., Anhui (CN)

( * ) Notice: Subject to any disclaimer, the term of this patent is extended or adjusted under 35 U.S.C. 154(b) by 142 days.

(21) Appl. No.: 18/263,583

(22) PCT Filed: Mar. 22, 2022

(86) PCT No.: PCT/CN2022/082190
§ 371 (c)(1),
(2) Date: Jul. 31, 2023

(87) PCT Pub. No.: WO2023/273427
PCT Pub. Date: Jan. 5, 2023

(65) Prior Publication Data
US 2024/0085448 A1   Mar. 14, 2024

(30) Foreign Application Priority Data

Jun. 30, 2021   (CN) .................. 202110748440.5

(51) Int. Cl.
*G01P 3/68*   (2006.01)
*G06T 7/246*   (2017.01)
(Continued)

(52) U.S. Cl.
CPC .............. *G01P 3/68* (2013.01); *G06T 7/248* (2017.01); *G06T 7/292* (2017.01); *G06T 7/337* (2017.01);
(Continued)

(58) Field of Classification Search
CPC ... G01P 3/68; G06T 7/292; G06T 7/38; G06T 7/337; G06T 7/248; G06T 2207/10016; G06T 2207/10048
See application file for complete search history.

(56) References Cited

U.S. PATENT DOCUMENTS

2014/0334675 A1* 11/2014 Chu ..................... G06T 7/73
382/103

FOREIGN PATENT DOCUMENTS

| CN | 102519481 A | 6/2012 |
| CN | 102519481 B * | 9/2013 |

(Continued)

OTHER PUBLICATIONS

Ho et al., Optical flow estimation using Fourier Mellin Transform, 2008 IEEE Conference on Computer Vision and Pattern Reco, 8 pages.

(Continued)

*Primary Examiner* — Jamel E Williams
(74) *Attorney, Agent, or Firm* — MUNCY, GEISSLER, OLDS & LOWE, P.C.

(57) ABSTRACT

The present invention provides a speed measurement method and apparatus using a plurality of cameras. The speed measurement method includes: S1: calibrating positions of the respective cameras in a camera group, which are on a mobile platform at fixed relative positions; S2: obtaining a sequence of synchronized images from the respective cameras in the camera group, and recording time stamps thereof; and S3: performing a registration on the images
(Continued)

captured by the respective cameras in the camera group and, if a registration result of two of the images is greater than a first threshold, calculating a position transformation matrix for the two images, and then calculating a position transformation matrix for the mobile platform based on the positional relationships between the cameras that captured the two images, and finally calculating a speed information of the mobile platform based on the position transformation matrix and an interval between times when the two images were captured. Calculating a speed of the mobile platform through registration of images captured by different cameras can overcome the problem with single camera-based speed measurement that the distance between locations where successive images are captured conflict with a degree of coincidence of the images and enables the obtainment of high-accuracy moving speed information.

20 Claims, 4 Drawing Sheets

(51) Int. Cl.
  *G06T 7/292*  (2017.01)
  *G06T 7/33*  (2017.01)
  *G06T 7/38*  (2017.01)
(52) U.S. Cl.
  CPC ...... *G06T 7/38* (2017.01); *G06T 2207/10016* (2013.01); *G06T 2207/10048* (2013.01)

(56) References Cited

FOREIGN PATENT DOCUMENTS

| | | | | | |
|---|---|---|---|---|---|
| CN | 104268882 | A | | 1/2015 | |
| CN | 105825518 | A | | 8/2016 | |
| CN | 106370884 | A | | 2/2017 | |
| CN | 106403924 | A | | 2/2017 | |
| CN | 108426566 | A | | 8/2018 | |
| CN | 105825518 | B | * | 3/2019 | ............. G06T 17/00 |
| CN | 112639883 | A | | 4/2021 | |
| CN | 113504385 | A | * | 10/2021 | ............. G06T 7/292 |
| JP | H07318652 | A | | 12/1995 | |
| JP | 2000097968 | A | | 4/2000 | |
| JP | 2007263669 | A | | 10/2007 | |
| JP | 2010267114 | A | | 11/2010 | |
| JP | 2011217233 | A | | 10/2011 | |
| JP | 2013104861 | A | | 5/2013 | |
| JP | 2019070983 | A | | 5/2019 | |
| JP | 2020107938 | A | | 7/2020 | |
| JP | 2021012155 | A | | 2/2021 | |
| WO | WO2017145541 | A1 | | 8/2017 | |
| WO | WO2021004548 | A1 | | 1/2021 | |

OTHER PUBLICATIONS

Tong, Zhixue; "Localization and ego velocity estimation for vehicle based on binocular image sequences"; Journal of Applied Optics; vol. 38, No. 5; Sep. 2017; pp. 1-6.

* cited by examiner

SPEED MEASUREMENT METHOD AND APPARATUS BASED ON MULTIPLE CAMERAS

TECHNICAL FIELD

The present invention relates to the field of speed measurement technology and, in particular to a speed measurement method and apparatus using a plurality of cameras.

BACKGROUND

With the continual development of electronic information, automatic control and other technologies, robots have been increasingly used in our production activities and daily lives. As representatives of them, mobile robots with moving, sensing, handling and other abilities have been widely used in various industries. Particular applications of mobile robot technology include, among others, floor sweeping robots for household use, automated guided vehicles (AGVs) and smart forklifts frequently seen in industrial settings and service robots deployed in hotels and hospitals.

For good control of a mobile robot, real-time detection of its speed would be desirable, which is, however, challenging. In most contemporary applications, encoders are attached to left and right wheels of mobile robots for speed measurement. However, this approach is essentially absent of feedback from the real surroundings. Therefore, when any wheel slips or is raised from the ground, the mobile robot may acquire an incorrectly detected speed and thus tends to misjudge its own position and operating conditions, which may eventually lead to unpredictable errors. This poses great challenges to the safety and stability of the robot's movement.

SUMMARY OF THE INVENTION

It is an object of the present invention to present a speed measurement method and apparatus using a plurality of cameras, which are capable of accurate speed measurement without being affected by external factors.

The above object is attained by a speed measurement method using a plurality of cameras provided in the present invention, which comprises the steps of:

S1: calibrating positions of the individual cameras in a camera group, which are arranged on a mobile platform at fixed relative positions, to obtain positional relationships among the cameras and positional relationships between the cameras and the mobile platform;

S2: obtaining a sequence of synchronized images from the respective cameras in the camera group, and recording time stamps of the sequences of synchronized images; and S3: performing registration on the images captured by the respective cameras in the camera group and, if a registration result of two of the images is greater than a first threshold, calculating a position transformation matrix for the two images, then calculating a position transformation matrix for the mobile platform over an interval between times when the two images were captured based on: i) the positional relationship between the cameras that captured the two images; ii) the positional relationships between the cameras that captured the two images and the mobile platform; and iii) the position transformation matrix for the two images, and finally calculating speed information of the mobile platform based on the position transformation matrix of the mobile platform and the interval between the times when the two images were captured.

Optionally, S3 may comprise:

S31: acquiring position information of the mobile platform at the current time and, calculating a first position of a first one of the cameras at the current time based on: the position information of the mobile platform at the current time and the positional relationship between a first one of the cameras and the mobile platform;

S32: based on the first position, successively searching second positions of the other camera(s) where images were captured and, if a distance between any second position and the first position is smaller than a second threshold, determining that the search is successful, taking the images captured at the first position and the second position as a search image and a candidate image, respectively, recording the time stamps of the search and candidate images, and proceeding to S33;

S33: registering the search and candidate images and, if a registration result is greater than the first threshold, determining that the registration is successful, calculating a position transformation matrix for the search and candidate images, and proceeding to S34; and S34: calculating a position transformation matrix for the first camera based on: the positional relationship of the cameras that captured the search and candidate image; and the position transformation matrix for the search and candidate image, calculating a position transformation matrix for the mobile platform based on: the position transformation matrix for the first camera; and the positional relationship of the first camera and the mobile platform, and calculating speed information of the mobile platform based on: the position transformation matrix for the mobile platform; and an interval between times when the two images were captured.

Optionally, determining the position information of the mobile platform at the current time may comprise:

registering the search image to an image of a previous frame, of the first camera, to derive a position transformation matrix for the first camera; and calculating the position information of the mobile platform based on the position transformation matrix of the first camera and the positional relationship of the first camera to the mobile platform.

Optionally, during calculating the position information of the mobile platform based on the position transformation matrix of the first camera derived by registering the search image of the first camera to the image of the previous frame thereof, and the positional relationship of the first camera to the mobile platform, the position information of the mobile platform may be calculated by a weighted average, wherein weights are assigned to the respective cameras according to registration results thereof.

Optionally, the registration may be accomplished using a two-dimensional image feature matching method comprising extracting feature points from the two images and performing a rapid matching of the feature points to obtain the position transformation matrix for the two images.

Optionally, the registration may be accomplished using a two-dimensional image frequency-domain information matching method comprising: calculating a rotation and translational factor and a scaling factor for the two images using a Fourier-Mellin transform algorithm to obtain the position transformation matrix for the two images.

Optionally, the registration may be accomplished using a three-dimensional matching method, wherein the three-dimensional matching method comprises calculating position and orientation with three degrees of freedom in a space through coordinates of three-dimensional points corresponding to the two images to obtain the position transformation matrix for the two images.

Optionally, the position information of the mobile platform at the current time may be directly acquired from a position sensor.

Optionally, if the search or registration fails in step S32 or S33, the method may proceed to S35, wherein S35 comprises:

estimating speed information of the mobile platform based on the position information of the mobile platform at the current time, position information thereof at a previous time and the difference between the current and previous times.

The above object is also attained by a speed measurement apparatus using a plurality of cameras provided in the present invention, which comprises:

a mobile platform, configured to move with respect an object to be imaged;

a camera group, comprising at least two cameras arranged on the mobile platform at fixed relative positions; and a processor, configured to implement the speed measurement method as defined above.

Optionally, the camera group may have a light source compatible with the cameras, which comprises:

a near-infrared light source, in case of the cameras being implemented as compatible cameras with lenses allowing transmission of light emitted from the near-infrared light source; or a far-infrared light source, in case of the cameras being implemented as compatible far-infrared cameras; or an ultraviolet light source, in case of the cameras being implemented as compatible ultraviolet cameras; or a light source producing polarized light, in case of the cameras being implemented as compatible cameras with lenses allowing transmission of the polarized light from the light source.

Optionally, the cameras may capture images in synchronization or with time stamps.

Optionally, the speed measurement apparatus may further comprise a calibration tool arranged on the mobile platform, which is used to calibrate: relative positional relationships among the cameras; and positional relationships of the cameras and the mobile platform.

Optionally, the calibration tool may be a chessboard, a laser range finder, a lidar, a TOF sensor or an encoder.

Optionally, the camera group may comprise at least one pair of binocular cameras.

Optionally, the camera group may comprise at least two TOF cameras arranged along a principal moving direction of the mobile platform.

Optionally, the camera group may comprise at least one pair of line scan cameras arranged along the principal moving direction of the mobile platform.

Optionally, the camera group may further comprise at least one area scan camera with a global shutter, wherein the processor is configured to compare images captured by the line scan cameras with an image captured by the area scan camera in order to correct the images captured by the line scan cameras.

Optionally, when a registration result of two images is smaller than a first threshold, the processor may be configured to estimate speed information of the mobile platform based on position information of the mobile platform at the current time, position information thereof at a previous time and the difference between the current and previous times.

Optionally, the speed measurement apparatus may further comprise at least one laser measuring device for measuring a distance between different objects to be imaged.

Optionally, the laser measuring device may be a line laser measuring device or a cross laser measuring device.

In the speed measurement method and apparatus of the present invention, through registration processing of images captured by different cameras, two highly similar images having the shortest distance to be measured and the highest degree of coincidence can be identified, thus, the accuracy of speed information of the mobile platform calculated by a speed measurement method using a plurality of cameras is higher than speed information of the captured object calculated by a method using a single camera for continuous image tracking. Moreover, the proposed method and apparatus allow feedback from the real surroundings, avoiding the problem of a possible misjudgment made when any wheel of a robot slips or is raised from the ground.

BRIEF DESCRIPTION OF THE DRAWINGS

Those of ordinary skill in the art will appreciate that the following drawings are presented merely to enable a better understanding of the present invention rather than to limit the scope thereof in any sense. In the drawings.

In these figures, 101, a camera group; 102, a camera; 103, a light source; 110, a processor; 111, a mobile platform;

W, a world coordinate system; and C, a central coordinate system.

DETAILED DESCRIPTION

As discussed in the Background section, in most contemporary applications, encoders are attached to left and right wheels of mobile robots for speed measurement. However, this approach is essentially absent of feedback from the real surroundings. Therefore, when any wheel slips or is raised from the ground, the mobile robot may obtain an inaccurately detected speed and thus tends to misjudge its own position and operating conditions, which may eventually lead to unpredictable errors. This poses great challenges to the safety and stability of the robot's movement.

As known, it is very effective to calculate a moving speed from a video consisting of a sequence of images of the ground captured by a camera oriented toward the ground. However, as the accuracy of speed measurement depends on a distance between the positions of two images for comparative calculation, as well as a degree of coincidence between the images, in order to achieve enhance visual speed measurement performance, it is important to reduce the distance and increase the degree of coincidence between the two images. Due to a limited field of view of a single camera, when the two images are captured at locations that are spaced relatively distant from each other, the degree of coincidence between them will be low, which is unfavorable to the accuracy of visual speed measurement.

In view of this, the present invention provides a speed measurement method and apparatus using a plurality of cameras, which can obtain high-accuracy moving speed information by comparing images captured by at least two cameras with fixed relative positions.

Objects, advantages and features of the present invention will become more apparent upon reading the following more detailed description of the present invention, which is set forth by way of particular embodiments with reference to the accompanying drawings. Note that the figures are provided in a very simplified form not necessarily drawn to exact scale and for the only purpose of facilitating easy and clear description of the embodiments. In addition, the structures shown in the figures are usually partial representations of their actual counterparts. In particular, as the figures would have different emphases, they are sometimes drawn to different scales.

As used herein, the singular forms "a", "an" and "the" include plural referents, unless the context clearly dictates otherwise. As used herein, the term "or" is generally employed in the sense including "and/or", unless the context clearly dictates otherwise. As used herein, the term "several" is generally employed in the sense including "at least one", unless the context clearly dictates otherwise. As used herein, the phrase "at least two" is generally employed in the sense including "two or more than two", unless the context clearly dictates otherwise. Additionally, the use of the terms "first", "second" and "third" herein is intended for illustration only and is not to be construed as denoting or implying relative importance or as implicitly indicating the numerical number of the referenced item. Accordingly, defining an item with "first", "second" or "third" is an explicit or implicit indication of the presence of one or at least two of the items.

In principle, the present invention seeks to overcome the correctness and accuracy problems with conventional robot speed measurement by presenting a speed measurement method and apparatus using a plurality of cameras.

The speed measurement method using a plurality of cameras includes the steps of:
  S1: calibrating positions of individual cameras in a camera group arranged on a mobile platform at fixed relative positions, to obtain positional relationships among the cameras and positional relationships between the cameras and the mobile platform;
  S2: obtaining sequences of synchronized images from the respective cameras in the camera group, and recording time stamps of the sequences of synchronized images; and
  S3: performing registration on the images captured by the respective cameras in the camera group and, if a registration result of two of the images is greater than a first threshold, calculating a position transformation matrix for the two images, and then calculating a position transformation matrix for the mobile platform over an interval between times when the two images were captured based on: i) the positional relationship between the cameras that captured the two images; ii) the positional relationships between the cameras that captured the two images and the mobile platform; and iii) the position transformation matrix for the two images, and finally calculating speed information of the mobile platform from the position transformation matrix of the mobile platform and the interval between the times when the two images were captured.

As another aspect of the present invention, the speed measurement apparatus using a plurality of cameras includes:
  a mobile platform, configured to move with respect to an object to be imaged;
  a camera group, including at least two cameras arranged on the mobile platform at fixed relative positions;
  a processor, configured to implement the speed measurement method as defined above.

With this arrangement, through registration of images captured by the individual cameras, two highly similar images having the shortest distance to be measured and the highest degree of coincidence can be identified, thus, the accuracy of speed information of the mobile platform calculated by a speed measurement method using a plurality of cameras is higher than speed information of the captured object calculated by a method using a single camera for continuous image tracking. Moreover, the proposed method and apparatus allow feedback from the real surroundings, avoiding the problem of a possible misjudgment made when any wheel of a robot slips or is raised from the ground.

In the following, the present invention will be further described with reference to the accompanying drawings.

Figure 1:
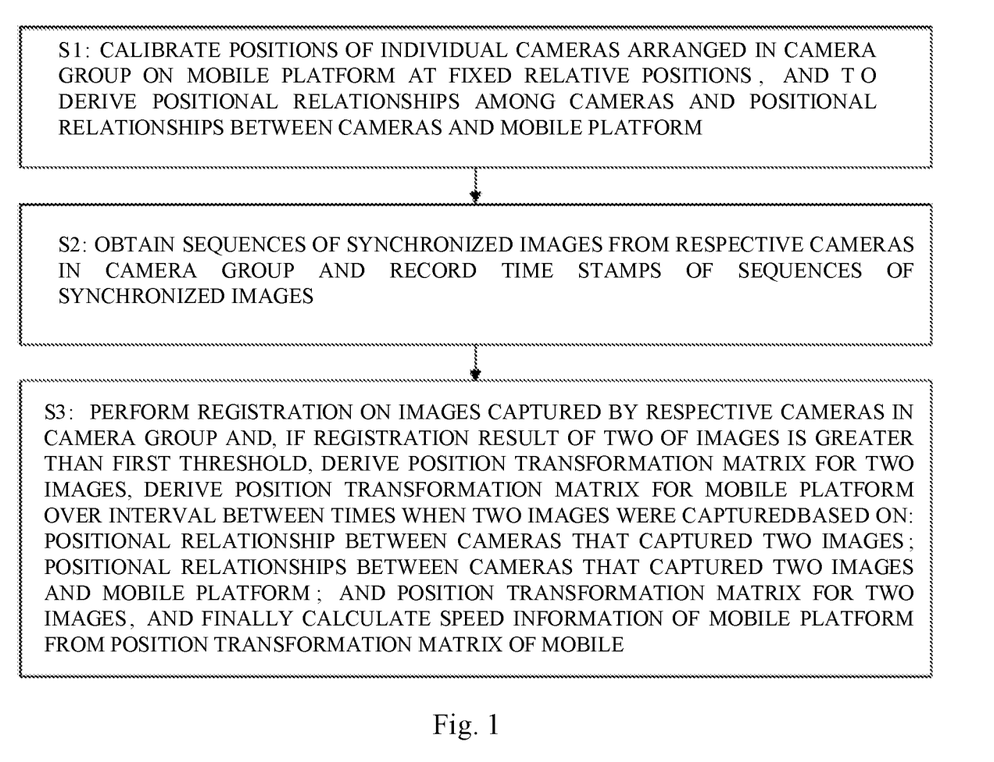
FIG. 1 illustrates steps in a speed measurement method using a plurality of cameras according to an embodiment of the present invention.
Figure 2:
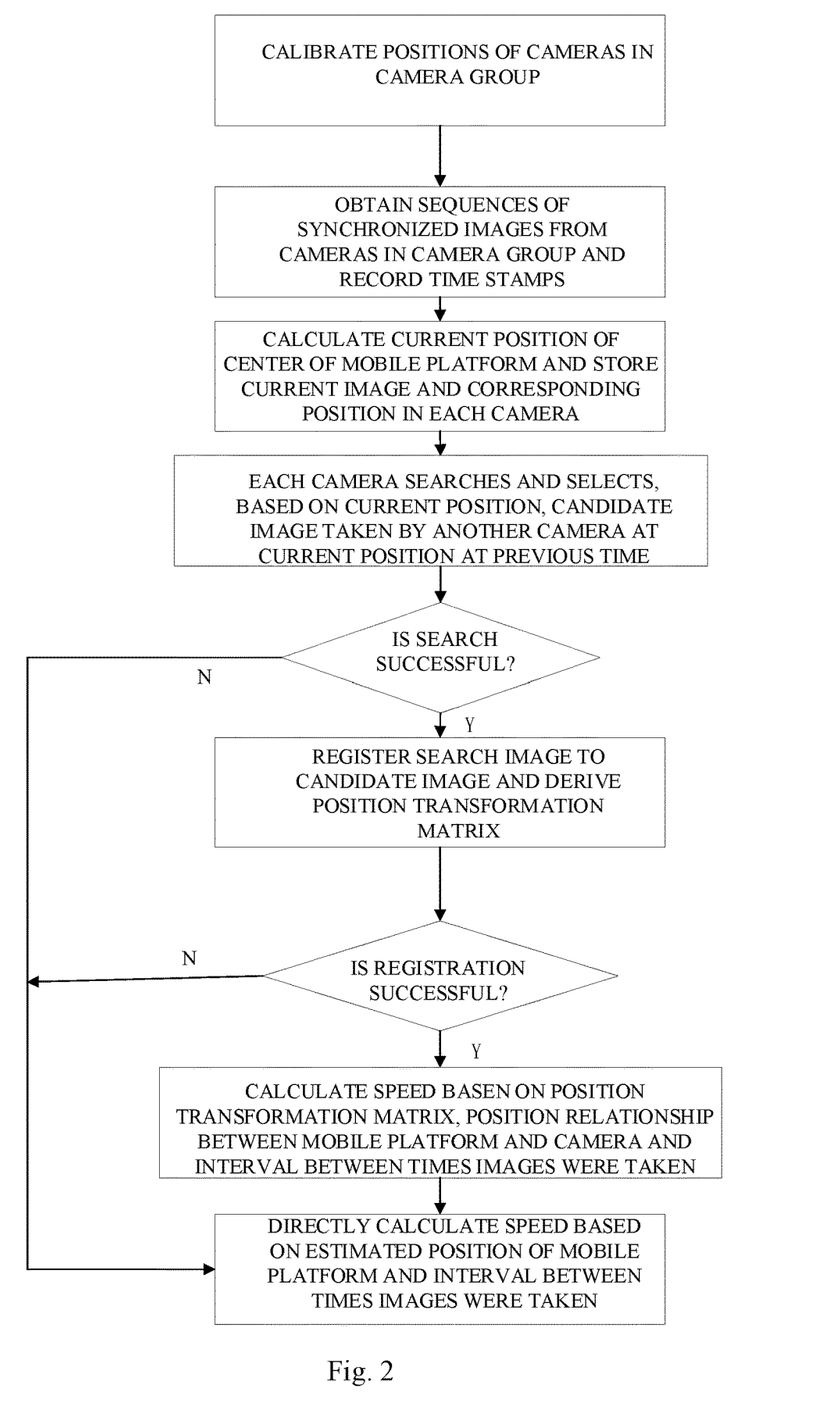
FIG. 2 is a flowchart of a speed measurement method using a plurality of cameras according to an embodiment of the present invention.
Figure 3:
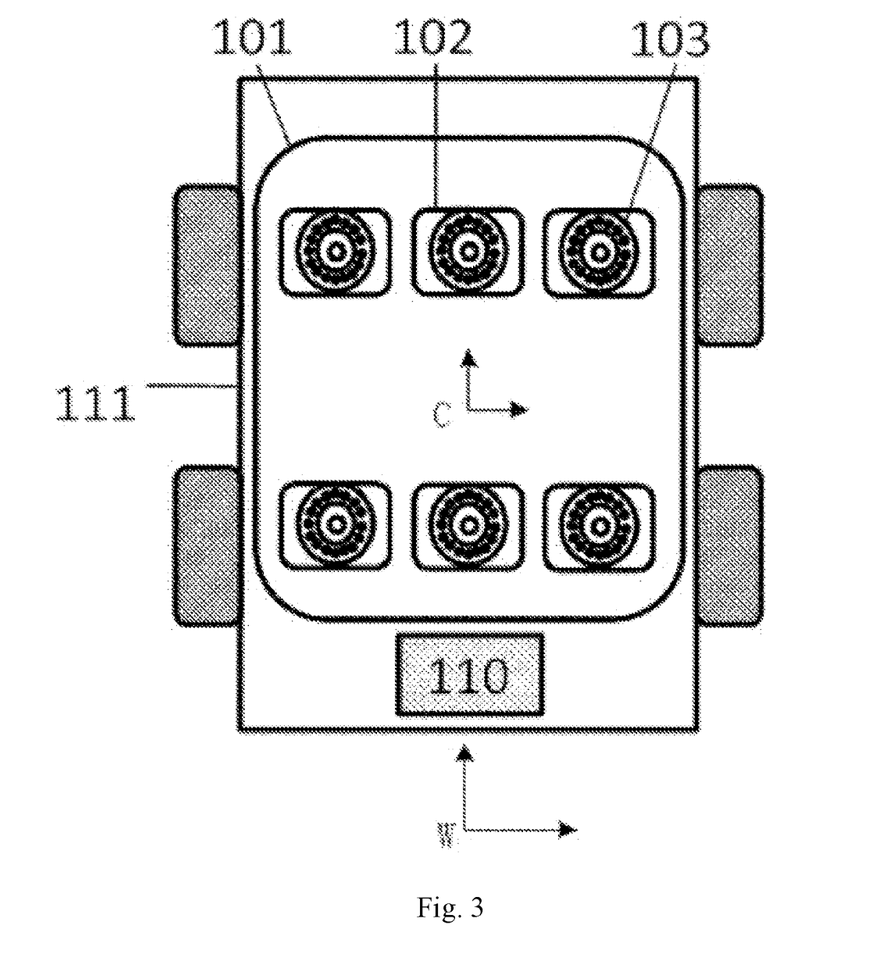
FIG. 3 is a schematic diagram showing the structure of a speed measurement apparatus using a plurality of cameras according to an embodiment of the present invention.

Reference is now made to FIGS. 1 to 3. FIG. 1 illustrates steps in a speed measurement method using a plurality of cameras according to an embodiment of the present invention. FIG. 2 is a flowchart of a speed measurement method using a plurality of cameras according to an embodiment of the present invention. FIG. 3 is a schematic diagram showing the structure of a speed measurement apparatus using a plurality of cameras according to an embodiment of the present invention. A speed measurement method using a plurality of cameras according to an embodiment of the present invention includes the steps of:
  S1: calibrating positions of individual cameras 102 in a camera group 101 arranged on a mobile platform 111 at fixed relative positions, to calculate positional relationships among the cameras 102 and positional relationships between the cameras 102 and the mobile platform 111;
  S2: obtaining sequences of synchronized images from the respective cameras 102 in the camera group 101, and recording time stamps of the sequence of synchronized images; and
  S3: performing registration on the images captured by the respective cameras 102 in the camera group 101 and, if a registration result of two of the images is greater than a first threshold, calculating a position transformation matrix for the two images, then calculating a position transformation matrix for the mobile platform 111 over an interval between times when the two images were captured based on: the positional relationship between the cameras 102 that captured the two images; the position transformation matrix for the two images; and the positional relationships of the cameras 102 that captured the two images with respect to the mobile platform 111, and finally calculating speed information of the mobile platform 111 based on the position transformation matrix of the mobile platform 111 and the interval between the times when the two images were captured.

As shown in FIG. 3, a speed measurement apparatus using a plurality of cameras according to an embodiment includes:
  a mobile platform 111, configured to move with respect to an object to be imaged;

a camera group 101, including at least two cameras 102 arranged on the mobile platform 111 at fixed relative positions;

a processor 110, configured to implement the speed measurement method as defined above.

At first, step S1 is performed to calibrate positions of the individual cameras 102 in the camera group 101, to derive positional relationships among the cameras 102 and positional relationships between the cameras 102 and the mobile platform 111. Before the calibration, a world coordinate system W and a vehicle-body coordinate system C of the mobile platform 111 are established. The world coordinate system W may take a random point as its origin, while the vehicle-body coordinate system C takes a center of the mobile platform 111 as its origin. In the present invention, each of the coordinate systems is a right-handed coordinate system having an X axis defined as a direction in which the mobile platform 111 is moving, a Y axis extending laterally to the right from the mobile platform 111, and a Z axis extending vertically downward toward the ground.

Regarding the moving speed of the mobile platform 111, only translation and rotation within a two-dimensional plane is considered. Therefore, a representation of the position information only considers a horizontal plane. The positions of the mobile platform 111 and all the cameras 102 in the camera group 101 are represented in the world coordinate system W. The position of the mobile platform 111 is represented by its physical center. The position of each camera 102 in the camera group 101 is represented by a center of the camera 102.

Specifically, if the mobile platform 111 is positioned at coordinates c(x, y) and oriented at an angle θ at a time $t_k$, then its position in the world coordinate system W can be expressed by the matrix:

$$P_c^k = \begin{bmatrix} \cos(\theta) & -\sin(\theta) & x \\ \sin(\theta) & \cos(\theta) & y \\ 0 & 0 & 1 \end{bmatrix} \quad (1)$$

Each camera 102 in the camera group 101 is fixed in position with respect to the mobile platform 111. The position of an i-th one of the cameras 102 with respect to the mobile platform 111 may be denoted as $P_{ci}$, where i=1, 2, ..., M, and M represents the number of cameras 102 in the camera group 101.

$$P_{ci} = \begin{bmatrix} \cos(\theta_{ci}) & -\sin(\theta_{ci}) & \Delta x_{ci} \\ \sin(\theta_{ci}) & \cos(\theta_{ci}) & \Delta y_{ci} \\ 0 & 0 & 1 \end{bmatrix} \quad (2)$$

where $\theta_{ci}$ is an angle of the i-th camera 102 with respect to the mobile platform 111, and $\Delta x_{ci}$ and $\Delta y_{ci}$ are coordinates of the i-th camera 102 in the vehicle-body coordinate system C of the mobile platform 111.

In the present invention, the calibration for deriving the positional relationships among the cameras 102 and the positional relationships of the cameras 102 to the mobile platform 111 may be accomplished with a chessboard, a laser range finder, a lidar, a TOF sensor or encoder.

Step S2 is then performed to obtain sequences of synchronized images from the respective cameras 102 in the camera group 101 and record time stamps when the sequence of synchronized images captured. In the present invention, at the time $t_k$, the cameras 102 in the camera group 101 synchronously capture images $F_i^k$, where i=1, 2, ..., M. $F_i^k$ represents image data captured by the i-th camera 102 at the time $t_k$, and M represents the number of cameras 102 in the camera group 101. At the same when the synchronized image data is captured, a corresponding time stamp $t_k$ of the synchronized images is recorded.

Subsequently, step S3 is performed, in which registration is performed on the images captured by the respective cameras 102 in the camera group 101. If a registration result of two images is greater than a first threshold, a position transformation matrix for the two images is derived, and a position transformation matrix for the mobile platform 111 over an interval between times when the two images were captured is derived based on: the positional relationship between the cameras 102 that captured the two images; the position transformation matrix for the two images; and the positional relationships of the cameras 102 that captured the two images with respect to the mobile platform 111. Finally, speed information of the mobile platform 111 is calculated from the position transformation matrix of the mobile platform 111 and the interval between the times when the two images were captured.

S3 specifically includes:

S31: obtaining position information of the mobile platform 111 at the current time and, from the position information of the mobile platform 111 at the current time and the positional relationship between a first one of the cameras 102 and the mobile platform 111, calculating a first position of the first camera 102 at the current time;

S32: based on the first position, successively checking second positions of the other camera(s) 102 where images were taken and, if a distance between any second position and the first position is smaller than a second threshold, determining that the search is successful, taking the images taken at the first position and the second position as a search image and a candidate image, respectively, recording the time stamps of the search and candidate images, and proceeding to S33;

S33: registering the search and candidate images and, if a result of the registration is greater than the first threshold, determining that the registration is successful, deriving a position transformation matrix for the search and candidate images, and proceeding to S34; and S34: deriving a position transformation matrix for the first camera 102 based on the positional relationship of the cameras 102 that took the search and candidate images, and the position transformation matrix for the search and candidate image; then deriving a position transformation matrix for the mobile platform 111 based on the position transformation matrix for the first camera 102, and the positional relationship of the first camera 102 and the mobile platform 111; and finally calculating speed information of the mobile platform 111 based on the position transformation matrix for the mobile platform 111, and an interval between times when the two images were captured.

Specifically, after the completion of step S2, step S31 is performed to determine position information of the mobile platform 111 at the current time, and store the search image and corresponding position information of each camera 102.

Obtaining the position information of the mobile platform 111 at the current time may further include:

registering the search image to an image of a previous frame of the first camera 102, thereby deriving a position transformation matrix for the first camera 102; and calculating the position information of the mobile platform 111 based on the position transformation matrix of the first camera 102 and the positional relationship of the first camera 102 and the mobile platform 111.

That is, the position of the mobile platform 111 can be estimated through each camera 102 in the camera group 101. For example, for each camera 102 in the camera group 101, its search image $F_i^k$ captured at the time $t_k$ may be registered to a previous frame image $F_i^{k-1}$ thereof, thereby deriving a position transformation matrix for this camera 102.

As a first preferred example of this embodiment, the registration may be accomplished using a two-dimensional image feature matching method involving: extracting feature points from the two images, and performing a rapid matching of the feature points to derive the position transformation matrix $P_i^{k,k-1}$ from the two images. $P_i^{k,k-1}$ represents the position transformation matrix of the i-th camera 102 at the times $t_{k-1}$ and $t_k$.

As a second preferred example of this embodiment, the registration may be accomplished using a two-dimensional image frequency-domain information matching method involving: calculating a rotation and translation, and a scaling factor for the two images using a Fourier-Mellin transform algorithm, to derive the position transformation matrix $P_i^{k,k-1}$ for the two images.

As a third preferred example of this embodiment, the registration may be accomplished using a three-dimensional (3D) matching method involving: calculating a position and orientation with three degrees of freedom in the space, through coordinates of 3D points corresponding to the two images to derive the position transformation matrix $P_i^{k,k-1}$ for the two images. For example, when the i-th camera 102 is a TOF camera or is equipped with a laser range finder or a single-line or multi-line lidar, it captures image data containing depth information, and a current position of the i-th camera 102 can be estimated by 3D matching. Positional and orientational transformation with three degrees of freedom in the space is calculated from the coordinates of 3D points corresponding to the two images using an iterative closest point (ICP) method, or the position transformation matrix $P_i^{k,k-1}$ for the two images is derived using a PnP algorithm based on 3D coordinates in an image captured at a previous time point and 2D coordinates in an image captured at the current time.

The position transformation matrix $P_i^{k,k-1}$ for the i-th camera 102 derived from the successively images captured at the time $t_k$ and a previous time is transformed into a position transformation matrix for the mobile platform 111 by a rigid-body transformation according to:

$$P_c^{k,k-1} = P_{ci} \times P_i^{k,k-1} \times P_{ci}^{-1} \quad (3)$$

Since $P_{ci}^{-1}$ is the inverse matrix of $P_{ci}$, and $P_{ci}$ is a matrix describing the known positional relationship of the i-th camera 102 and the mobile platform 111, the position transformation matrix $P_c^{k,k-1}$ for the mobile platform 111 can be directly calculated from the position transformation matrix $P_i^{k,k-1}$.

The position $P_c^k$ of the mobile platform 111 at the time $t_k$ can be calculated from the position $P_c^{k-1}$ of the mobile platform 111 at the time $t_{k-1}$ and the position transformation matrix $P_c^{k,k-1}$ according to:

$$P_c^k = P_c^{k,k-1} \times P_c^{k-1} \quad (4)$$

For each i-th camera 102, based on the position $P_c^k$ of the mobile platform 111 at the time $t_k$ and the positional relationship of the specific camera 102 and the mobile platform 111, the position of the camera 102 at the time $t_k$ can be calculated according to:

$$P_i^k = P_{ci}^{-1} \times P_c^k \quad (5)$$

Each camera 102 stores the search image $F_i^k$ captured at the current time, and the position of the camera 102 corresponding to the search image $F_i^k$ at the time $t_k$ is $P_i^k$.

In the present invention, the position information of the mobile platform 111 at the current time may alternatively be obtained directly from a position sensor. Examples of the position sensor include, but are not limited to, encoders, inertial devices and odometers.

As another alternative method, the position transformation matrix for the first camera 102 can be calculated through registering the search image of the first camera 102 to an image of the previous frame, and calculating the position information of the mobile platform 111 based on both the position transformation matrix for the first camera 102 and the positional relationship of the first camera 102 with respect to the mobile platform 111, associated weights may be assigned to respective cameras 102 according to their registration results, and the position information of the mobile platform 111 may be calculated by weighted average.

In other words, one estimate of the position $P_c^k$ of the mobile platform 111 can be obtained from a result of registering the successive images of each i-th camera 102 in the camera group 101 according to equations (3) and (4) and from its position transformation matrix. In order to more accurately determine the position of the mobile platform 111, calculation results (e.g., of the position $P_c^k$ of the mobile platform 111) of all the cameras 102 may be subjected to a weighted average, wherein weights used in the averaging process is determined through the registration results of the respective cameras 102.

If the registration results of the cameras 102 at the time $t_k$ is $s_i$, then the weights for the respective cameras 102 may be expressed as $$\alpha_i = s_i / \sum_j^M s_j \quad (6)$$

where j is 1, 2, . . . , M.

Accordingly, the position of the mobile platform 111 at the time $t_k$ can be calculated as:

$$P_c^k = \sum_i^M (\alpha_i \times P_{ci} \times p_i^{k,k-1} \times P_{ci}^{-1}) \times P_c^{k-1} \quad (7)$$

The position of the mobile platform 111 can be more accurately determined by weighted average.

After each camera 102 stores the search image and the corresponding position information, step S32 is performed, in which each camera 102 searches and selects, based on its current position $P_i^k$, a candidate image taken by another camera 102 at said current position at a previous time. Based on the position $P_i^k$ at the time $t_k$, each camera 102 in the camera group 101 successively checks the positions $P_l^{k'}$ of all the candidate images of the other camera(s) 102. $P_l^{k'}$ represents the position of an l-th (l≠i) camera 102 at a time $t_{k'}$. When $P_l^{k'}$ with the shortest distance from $P_i^k$ satisfies $$|P_i^k - _l^{k'}| < D \quad (8)$$

where D represents the second threshold, which is a given distance threshold, the time stamp $t_{k'}$ of the corresponding candidate image $F_l^{k'}$ of the l-th camera 102 is recorded.

Following the success of the search, step S33 is performed to register the search image to the candidate image.

When a result of the registration satisfies:

$$S_{i,l}^{k,k'} > \varepsilon \tag{9}$$

where $S_{i,l}^{k,k'}$ represents a registration score of the search image $F_i^k$ and the candidate image $F_l^{k'}$, and $\varepsilon$ is said first threshold, which is a given scoring threshold.

If the registration result is greater than the first threshold, it is determined that a match is found, and a position transformation matrix for the search and candidate images is determined.

According to equation (4), the position transformation matrix for the search and candidate images can be determined as satisfying:

$$P_i^k = P_{i,l}^{k,k'} \times P_l^{k'} \tag{10}$$

If a matching candidate image is identified, the control proceeds to step S34, in which a position transformation matrix for the first camera 102 is derived based on the positional relationship between the cameras 102 that captured the search and candidate images and based on the position transformation matrix for the search and candidate images, and a position transformation matrix for the mobile platform 111 based on the position transformation matrix for the first camera 102 and based on the positional relationship of the first camera 102 with respect to the mobile platform. Finally, based on the position transformation matrix for the mobile platform 111 and an interval between the times when the two images were taken, speed information of the mobile platform 111 is calculated.

Figure 4:
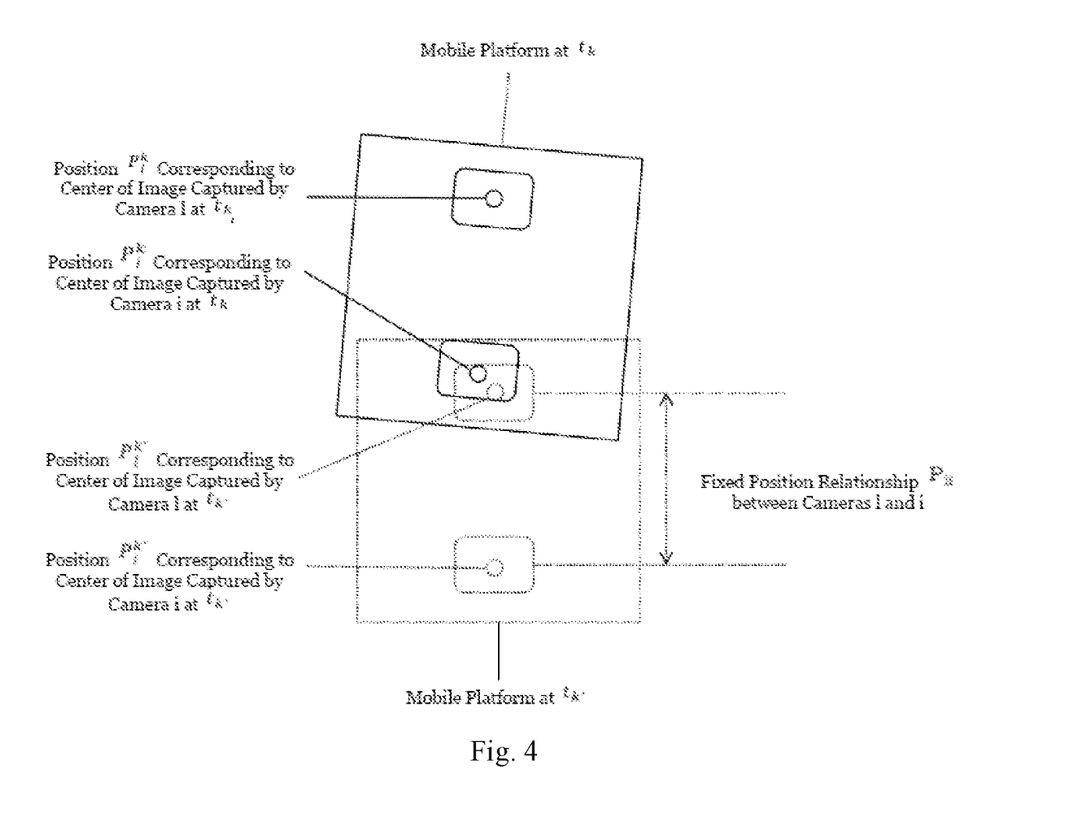
FIG. 4 schematically illustrates search and candidate image according to an embodiment of the present invention.

Reference is now made to FIG. 4, which schematically illustrates a search image and a candidate image according to an embodiment of the present invention. The search and candidate images were captured by cameras 102 arranged in a fixed positional relationship.

The position transformation matrix $P_i^{k,k'}$ for the i-th camera 102 at the times $t_k$ and $t_{k'}$ satisfies:

$$P_i^{k,k'} = (P_{i,l}^{k,k'} \times P_l^{k'})(P_{li} \times P_l^{k'})^{-1} \tag{11}$$

According to equation (10), a position offset $P_{i,l}^{k,k'}$ between the search image $F_i^k$ of the i-th camera 102 and the candidate image $F_l^{k'}$ can be obtained, and due to the known positional relationship $P_{li}$ between the i-th and l-th cameras 102 (at this time, the position $P_l^{k'}$ of the l-th camera 102 at the time $t_{k'}$ is also known, $P_k^{k,k'}$ can be calculated according to equation (11).

Further, according to equation (3) (i.e., $P_c^{k,k'} = P_{ci} \times P_i^{k,k'} \times P_{ci}^{-1}$), a change in position of the mobile platform 111 between the times $t_k$ and $t_{k'}$ can be calculated with the i-th camera 102. Because the search image $F_i^k$ captured by the i-th camera 102 at the time $t_k$ and the candidate image $F_l^{k'}$ captured by the l-th camera 102 have the shortest distance to be measured and the greatest degree of coincidence, $P_{i,l}^{k,k'}$, and hence $P_l^{k,k'}$ and $P_c^{k,k'}$, is more accurate than a result that can be obtained using continuous image tracking by a single camera.

$P_c^{k,k'}$ can be expressed in the following matrix form according to equation (1):

$$P_c^{k,k'} = \begin{bmatrix} \cos(\Delta\theta) & -\sin(\Delta\theta) & \Delta x \\ \sin(\Delta\theta) & \cos(\Delta\theta) & \Delta y \\ 0 & 0 & 1 \end{bmatrix} \tag{12}$$

Accordingly, a moving speed $V_i$ of the mobile platform 111 at the time $t_k$ can be calculated with the i-th camera 102 as:

$$V_i = \begin{cases} v_x = \Delta x/(t_k - t_{k'}) \\ v_y = \Delta y/(t_k - t_{k'}) \\ w = \Delta\theta/(t_k - t_{k'}) \end{cases} \tag{13}$$

The moving speed $V_i$ of the mobile platform 111 represents a speed of the camera group 101 with respect to the object to be imaged.

Likewise, a more accurate form of the moving speed can be obtained from the registration weights in equation (6) as:

$$V_c = \Sigma_j^M \alpha_i \times V_i \tag{14}$$

Further, if the search or matching in step S32 or S33 fails, the control proceeds to step S35, which includes:

estimating a speed of the camera group 101 with respect to the object to be imaged based on the position information of the mobile platform 111 at the current time, position information thereof at a previous time and an interval between the current and previous times (at which images are captured).

In other words, if no candidate image of the cameras 102 in the camera group 101 is found to satisfy equation (8), it is determined that the search fails and the control proceeds to step S35. Otherwise, it is determined that the search is successful and the control proceeds to step S33. If no match is found for the candidate images, the control also proceeds to step S35. Based on the position information $P_c^k$ of the mobile platform 111 at the current time obtained in step S31, the position information $P_c^{k-1}$ at the previous time and the difference between the current and previous times ($t_k - t_{k-1}$), a position transformation matrix for the mobile platform 111 over the interval between the two successive times can be derived as:

$$P_c^{k,k-1} = P_c^k \times (P_c^{k-1})^{-1} \tag{15}$$

Of course, it is also possible to directly obtain $P_c^{k,k-1}$ according to equation (3). $P_c^k$ and $P_c^{k-1}$ may also be calculated according to equation (7).

$P_c^{k,k-1}$ can be expressed in the following matrix form:

$$P_c^{k,k-1} = \begin{bmatrix} \cos(\Delta\theta) & -\sin(\Delta\theta) & \Delta x \\ \sin(\Delta\theta) & \cos(\Delta\theta) & \Delta y \\ 0 & 0 & 1 \end{bmatrix} \tag{16}$$

Finally, the moving speed of the mobile platform 111 at the time $t_k$ can be obtained as:

$$V_c = \begin{cases} v_x = \Delta x/(t_k - t_{k-1}) \\ v_y = \Delta y/(t_k - t_{k-1}) \\ w = \Delta\theta/(t_k - t_{k-1}) \end{cases} \tag{17}$$

According to embodiments of the present invention, through registration processing of images captured by the individual cameras 102, two highly similar images having the shortest distance to be measured and the highest degree of coincidence can be identified, thus, the accuracy of speed information of the mobile platform calculated by a speed measurement method using a plurality of cameras is higher than speed information of the captured object calculated by a method using a single camera for continuous image tracking.

Based on the above, with reference to FIG. 2, embodiments of the present invention also provide a speed measurement apparatus using a plurality of cameras 102, which includes:

a mobile platform 111, configured to move relative to an object to be imaged;

a camera group 101, including at least two cameras 102 arranged on the mobile platform 111 at fixed relative positions; and a processor 110, configured to implement the speed measurement method as defined above.

According to the present invention, the camera group 101 includes a light source 103 compatible with the cameras 102. The light source 103 may be implemented as:

a near-infrared light source 103, in case of the cameras 102 employing lenses allowing transmission of light emitted from the near-infrared light source 103; or a far-infrared light source 103, in case of the cameras 102 being implemented as compatible far-infrared cameras 102; or an ultraviolet light source 103, in case of the cameras 102 being implemented as compatible ultraviolet cameras 102; or a light source 103 that emits polarized light, in case of the cameras 102 being implemented as compatible cameras 102 employing lenses allowing transmission of the polarized light from the light source 103.

According to the present invention, the cameras 102 capture images in synchronization or with time stamps which can be acquired by the processor 110 in real time to facilitate moving speed calculation.

According to the present invention, the speed measurement apparatus may further include a calibration tool provided on the mobile platform 111, which is used to calibrate relative positional relationship among the cameras 102 and positional relationships of the cameras 102 and a center of the mobile platform 111. These positional relationships may be acquired by the processor 110.

The calibration tool may be a chessboard, a laser range finder, a lidar, a TOF sensor or encoder.

As a first preferred example of the present embodiment, the camera group 101 includes at least one pair of binocular cameras, which have a common field of view and are able to capture 3D images. In this case, the camera group 101 may be able to calculate a position and orientation, and speed with three or more degrees of freedom in the space based on distances between points in the images.

As a second preferred example of this embodiment, the camera group 101 includes at least two TOF cameras, which are arranged along a principal moving direction of the mobile platform 111 in order to ensure that higher accuracy can be obtained based on the distance and/or shape of the object to be imaged through matching of 3D images captured by the cameras arranged in tandem along the forward-backward direction.

As a third preferred example of this embodiment, the camera group 101 includes at least one pair of line scan cameras arranged along the principal moving direction of the mobile platform 111. Speed information of the camera group 101 can be obtained by comparing images captured by the line scan cameras.

Preferably, the camera group 101 further includes at least one 2D area scan camera with a global shutter, and the processor 110 is able to compare images captured by the line scan camera with an image captured by the 2D area scan camera in order to the correct the images captured by the line scan camera.

Further, the speed measurement apparatus may further include at least one laser measuring device for measuring the distance between said object to be imaged and another object to be imaged.

Further, the laser measuring device may be a line laser measuring device or a cross laser measuring device.

According to the present invention, the processor 110 can not only obtain high-accuracy speed information either by comparing images captured by different cameras, but also can obtain speed information from successive images captured by a single camera. The latter type of speed information can be used to roughly identify images captured by different cameras, which are suitable for being subjected to matching. This can enable a higher matching speed.

According to the present invention, if a registration result of two images is smaller than the first threshold, the processor 110 is able to estimate a speed of the camera group 101 relative to the object to be imaged based on position information of the center of the mobile platform 111 at the current time, position information thereof at a previous time and an interval between times when the images were captured.

In summary, embodiments of the present invention provides a speed measurement method and apparatus using a plurality of cameras, in which through registration processing of images captured by different cameras, two highly similar images having the shortest distance to be measured and the highest degree of coincidence can be identified, thus, the accuracy of speed information of the mobile platform calculated by a speed measurement method using a plurality of cameras is higher than speed information of the captured object calculated by a method using a single camera for continuous image tracking. Moreover, the proposed method and apparatus allow feedback from the real surroundings, avoiding the problem of a possible misjudgment made when any wheel of a robot slips or is raised from the ground.

Further, it is to be recognized that while the invention has been described above with reference to preferred embodiments thereof, it is not intended to be limited to these embodiments. In light of the above teachings, any person familiar with the art may make many possible modifications and variations to the disclosed embodiments or adapt them into equivalent embodiments, without departing from the scope of the invention. Accordingly, it is intended that any and all simple variations, equivalent changes and modifications made to the foregoing embodiments based on the substantive disclosure of the invention without departing from the scope thereof fall within this scope

What is claimed is:

1. A speed measurement method using a plurality of cameras, comprising the steps of:
S1: calibrating positions of respective cameras in a camera group, which are arranged on a mobile platform at fixed relative positions, to obtain positional relationships among the cameras and a positional relationship between each camera and the mobile platform;

S2: obtaining a sequence of synchronized images from the respective cameras in the camera group, and recording time stamps of the sequence of synchronized images; and S3: performing a registration on the images captured by the respective cameras in the camera group, wherein if a registration result of two of the images is greater than a first threshold, calculating a position transformation matrix for the two images, then calculating a position transformation matrix for the mobile platform over an interval between times when the two images were captured based on: i) a positional relationship between the cameras that captured the two image; ii) the positional relationships between the cameras that captured the two images and the mobile platform; and iii) the position transformation matrix for the two images, and finally calculating a speed information of the mobile platform based on: the position transformation matrix of the mobile platform, and the interval between the times when the two images were captured.

2. The speed measurement method of claim 1, wherein S3 comprises:

S31: acquiring a position information of the mobile platform at a current time;

calculating a first position of a first one of the cameras at the current time based on: the position information of the mobile platform at the current time; and the positional relationship between the first camera and the mobile platform, S32: based on the first position, successively searching second positions of the other camera(s) where images were captured; if a distance between a second position and the first position is smaller than a second threshold, determining that the search is successful, taking the images captured at the first position and the second position as a search image and a candidate image, respectively; recording the time stamps of the search and candidate images; and proceeding to S33, S33: registering the search and candidate images; if a registration result is greater than the first threshold, determining that the registration is successful and calculating a position transformation matrix for the search and candidate images; proceeding to S34, and S34: calculating a position transformation matrix for the first camera based on: the positional relationship of the cameras that captured the search and candidate images; and the position transformation matrix for the search and candidate images, calculating a position transformation matrix for the mobile platform based on: the position transformation matrix for the first camera; and the positional relationship of the first camera and the mobile platform, and calculating the speed information of the mobile platform based on: the position transformation matrix for the mobile platform; and an interval between times when the two images were captured.

3. The speed measurement method of claim 2, wherein determining the position information of the mobile platform at the current time comprises:

registering the search image to an image of a previous frame of the first camera to derive a position transformation matrix for the first camera; and calculating the position information of the mobile platform based on the position transformation matrix of the first camera, and the positional relationship of the first camera to the mobile platform.

4. The speed measurement method of claim 3, wherein during calculating the position information of the mobile platform based on the position transformation matrix of the first camera derived by registering the search image of the first camera to the image of the previous frame thereof, and the positional relationship of the first camera to the mobile platform, the position information of the mobile platform is calculated by a weighted average, wherein weights are assigned to the respective cameras according to registration results thereof.

5. The speed measurement method of claim 1, wherein the registration is accomplished using a two-dimensional image feature matching method comprising: extracting feature points from the two images and performing a rapid matching of the feature points to obtain the position transformation matrix for the two images.

6. The speed measurement method of claim 1, wherein the registration is accomplished using a two-dimensional image frequency-domain information matching method comprising: calculating a rotation and translational factor and a scaling factor for the two images using a Fourier-Mellin transform algorithm to obtain the position transformation matrix for the two images.

7. The speed measurement method of claim 1, wherein the registration is accomplished using a three-dimensional matching method, and wherein the three-dimensional matching method comprises calculating positions and orientations with three degrees of freedom in a space through coordinates of three-dimensional points corresponding to the two images to obtain the position transformation matrix for the two images.

8. The speed measurement method of claim 2, wherein the position information of the mobile platform at the current time is directly acquired from a position sensor.

9. The speed measurement method of claim 2, wherein if the search or the registration fails in step S32 or S33, the method proceeds to S35, and wherein S35 comprises:

estimating the speed information of the mobile platform based on the position information of the mobile platform at the current time, position information thereof at a previous time and a difference between the current and previous times.

10. A speed measurement apparatus using a plurality of cameras, comprising:

a mobile platform, configured to move with respect to an object to be imaged;

a camera group, comprising at least two cameras arranged on the mobile platform at fixed relative positions; and a processor, configured to implement the speed measurement method as defined in claim 1.

11. The speed measurement apparatus of claim 10, wherein the camera group has a light source compatible with the cameras, wherein the light source comprises:

a near-infrared light source, in case of the cameras being implemented as compatible cameras with lenses allowing transmission of a light emitted from the near-infrared light source; or a far-infrared light source, in case of the cameras being implemented as compatible far-infrared cameras; or an ultraviolet light source, in case of the cameras being implemented as compatible ultraviolet cameras; or a light source producing polarized light, in case of the cameras being implemented as compatible cameras with lenses allowing a transmission of the polarized light from the light source.

12. The speed measurement apparatus of claim 10, wherein the cameras capture images in synchronization or with time stamps.

13. The speed measurement apparatus of claim 10, further comprising a calibration tool arranged on the mobile platform, wherein the calibration tool is used to calibrate: a relative positional relationship among the cameras; and positional relationships of the cameras and the mobile platform.

14. The speed measurement apparatus of claim 13, wherein the calibration tool is a chessboard, a laser range finder, a lidar, a TOF sensor or an encoder.

15. The speed measurement apparatus of claim 10, wherein the camera group comprises at least one pair of binocular cameras.

16. The speed measurement apparatus of claim 10, wherein the camera group comprises at least two TOF cameras arranged along a principal moving direction of the mobile platform.

17. The speed measurement apparatus of claim 10, wherein the camera group comprises at least one pair of line scan cameras arranged along a principal moving direction of the mobile platform.

18. The speed measurement apparatus of claim 17, wherein the camera group further comprises at least one two-dimensional area scan camera with a global shutter, wherein the processor is configured to compare images captured by the line scan cameras with an image captured by the two-dimensional area scan camera in order to correct the images captured by the line scan cameras.

19. The speed measurement apparatus of claim 10, wherein when a registration result of two images is smaller than a first threshold, the processor is configured to estimate a speed information of the mobile platform based on a position information of the mobile platform at a current time, a position information thereof at a previous time and a difference between the current and previous times.

20. The speed measurement apparatus of claim 10, further comprising at least one laser measuring device for measuring a distance between different objects to be imaged, wherein the laser measuring device is a line laser measuring device or a cross laser measuring device.

* * * * *